US006708557B2

United States Patent
Moskwa et al.

(10) Patent No.: US 6,708,557 B2
(45) Date of Patent: Mar. 23, 2004

(54) INTERNAL COMBUSTION ENGINE SIMULATION AND TESTING

(75) Inventors: John J. Moskwa, Madison, WI (US); John L. Lahti, Marquette, MI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 24 days.

(21) Appl. No.: 10/075,013

(22) Filed: Feb. 13, 2002

(65) Prior Publication Data

US 2003/0150258 A1 Aug. 14, 2003

(51) Int. Cl.[7] .............................................. G01M 15/00
(52) U.S. Cl. ...................................................... 73/116
(58) Field of Search ............................ 73/116, 9, 862.18, 73/117.3, 117; 701/101, 111, 104, 102; 180/197; 123/339, 478, 352

(56) References Cited

U.S. PATENT DOCUMENTS

| | | | | |
|---|---|---|---|---|
| 4,169,372 A | * | 10/1979 | Colwill et al. | 73/862.18 |
| 4,301,678 A | * | 11/1981 | Full et al. | 73/116 |
| 4,697,561 A | * | 10/1987 | Citron | 123/339 |
| 4,807,467 A | * | 2/1989 | Kugler | 73/118.1 |
| 4,984,988 A | * | 1/1991 | Mizushina et al. | 434/380 |
| 5,157,965 A | * | 10/1992 | Koegeler et al. | 73/116 |
| 5,515,712 A | * | 5/1996 | Yunick | 73/9 |
| 6,212,945 B1 | | 4/2001 | Moskwa | |
| 6,248,040 B1 | * | 6/2001 | Minowa et al. | 477/98 |
| 6,379,283 B1 | * | 4/2002 | Cullen | 477/110 |

OTHER PUBLICATIONS

Moskwa, John J. Wang, Wenbo, Simplified Engine Combustion Diagnostics Using "Synthetic" Variables, *Society of Automotive Engineers, Inc.*, paper #2000–01–0364, USA.

Web page, Engine Simulation System for Torsional Vibration Test Applications, wysiwig://156/http/www.teamcorporation.com/engine_simulators.shtml, 1 page.

(List continued on next page.)

*Primary Examiner*—Edward Lefkowitz
*Assistant Examiner*—Octavia Davis
(74) *Attorney, Agent, or Firm*—Craig A. Fieschko, Esq.; DeWitt Ross & Stevens S.C.

(57) ABSTRACT

A dynamometer is coupled to a single cylinder version of a multi-cylinder engine. The dynamometer control system calculates the instantaneous dynamic torques (e.g., inertial, combustion, and/or other torques) that would normally be generated in the multi-cylinder engine. The control system then inputs the torque from the missing cylinders of the engine to the dynamometer, preferably by a hydraulic system capable of accurately applying these torque pulses. By inputting energy to the engine as well as receiving it, the single-cylinder engine can replicate the rapid transients that are experienced in multi-cylinder engine operation, and can therefore be made to have an instantaneous speed profile matching that of the multi-cylinder engine. This allows testing of the single-cylinder engine at all engine speeds (including very low speed operation, which has traditionally been problematic), and also allows transient speed and load testing on single-cylinder engines, where such testing has heretofore been infeasible. The dynamometer thereby expands use of simpler, more versatile, and less expensive single cylinder test engines in place of multi-cylinder test engines, thereby decreasing the time and cost of engine research efforts.

20 Claims, 2 Drawing Sheets

OTHER PUBLICATIONS

Allen, J, Law, D., Pitcher, G. and Williams, P., "A New Optical Access Research Engine for Advanced Fuel Spray and Combustion Analysis Using Laser Based Diagnostics", Lotus Engineering, International Symposium on Automotive Technology and Automation, 00POW004, 2000.

Dorey, R. and Wang, D., "A Hydrostatic Dynamometer for Engine Testing", Second Bath International Fluid Power Workshop, Sep. 1989.

Ghaffarzadeh, H., Guebeli, M., and Vaughan, N., "Linear Model Identification of a Hydrostatic Dynamometer through Dynamic Simulation", Fifth Bath International Fluid Power Workshop, Sep. 1992.

Babbitt, G., "Transient Engine Test System for Hardware-in-the-Loop Powertrain Development", Department of Mechanical Engineering, University of Wisconsin—Madison, Ph.D. dissertation, 1999.

Seaney, S., "Design and Construction of a High Bandwidth Dynamometer with Absorbing and Motoring Capability", Department of Mechanical Engineering, University of Wisconsin—Madison, Masters Thesis, 1994.

Babbitt, G. and Moskwa, J. "Implementation Details and Test Results for a Transient Engine Dynamometer and Hardware in the Loop Vehicle Model", IEEE CACSD–569, 1999.

Moskwa, John J., "High–Band Width Transient Engine Dynamometer System Control Using dSPACE Hardware and Software", presentation slides for dSPACE Users Conference, May 1–2, 2000, Detroit, MI (USA).

* cited by examiner

INTERNAL COMBUSTION ENGINE SIMULATION AND TESTING

FIELD OF THE INVENTION

This disclosure concerns an invention relating generally to methods and apparata for measuring and testing engine characteristics, and more specifically to dynamometers for use with internal combustion engines.

BACKGROUND OF THE INVENTION

The single-cylinder test engine (1CTE) has long been an important and widely-used tool in engineering and development of internal combustion engines. The 1CTE is typically a single cylinder, piston and head taken from a multi-cylinder engine (MCE), or having a design adapted from a cylinder, piston and head from a MCE, and which is used to simulate performance of an MCE on a smaller and simpler scale. Since the 1CTE has only a single cylinder, it is much easier to install and use modern laser diagnostics and other measurement instrumentation in a 1CTE than an MCE, thereby allowing more complete data collection regarding a cylinder's fluid dynamics, heat transfer, thermodynamics, emissions and other characteristics. Additionally, owing to the simpler design of 1CTEs, they are much less expensive and time-consuming to build and modify when working out design challenges associated with combustion chamber shape, timing, or other geometric and thermodynamic issues, or to experimentally validate computation fluid dynamic results or predictions made on computers.

Along with these benefits of 1CTEs come many drawbacks. The most significant drawback is the difficulty in using 1CTEs to simulate low engine speed testing in MCEs. This difficulty arises primarily owing to two problems: speed variation over the 1CTE engine cycle preventing accurate MCE performance simulation, and resonant frequencies of the testing system arising at low engine speeds.

The problem of speed variation is most significant in four-stroke 1CTE testing. Since four-stroke MCEs are in common use in transportation applications, it would naturally be valuable to utilize 1CTE's to simulate four-stroke MCEs. However, in four-stroke MCEs, each cylinder fires and provides kinetic energy to the crankshaft once every two crankshaft revolutions, with engine speed increasing during the expansion (power) stroke of the engine and then decreasing through the remaining three engine strokes of the combustion cycle. Since the multiple cylinders fire at different times in most MCEs, some cylinders provide increasing kinetic energy at the same time that kinetic energy output from other cylinders is decreasing, thereby resulting in relatively uniform engine speed. In contrast, during the two crankshaft revolutions between firings in a 1CTE, the 1CTE loses kinetic energy and slows down considerably. This problem is especially pronounced at low engine speeds (such as idle) because the time between cylinder firing increases. Thus, it is particularly difficult for a 1CTE to accurately simulate MCE operation at low speeds. To decrease this problem, a large flywheel (i.e., greater inertia) is typically added to the 1CTE crankshaft to store combustion energy as kinetic energy which is more uniformly released, thereby decreasing speed variation. Also, dynamometers with large polar moments of inertia are typically coupled to the 1CTE, further increasing the crankshaft inertia and allowing more uniform speed. While these measures prevent the 1CTE engine speed from decreasing significantly between cylinder firings, they also prevent accurate replication of the time-varying rotational dynamics that the 1CTE cylinder would experience if it was present in a MCE. (See, e.g., U.S. Pat. No. 6,212,945 to Moskwa and the references cited therein, which discuss dynamic engine models which take account of such time-varying dynamics.) Inertia addition additionally hinders useful study of transient engine operation (i.e., performance under changing speed conditions). As a result, the 1CTE does not accurately replicate MCE performance.

Resonant frequency problems arise because conventional electromagnetic engine dynamometer test systems have a resonant point at low engine speed. When the test engine is started and speeds up to the range desired for testing, it passes through the resonant point and causes excessive driveline vibration, which can skew test measurements and damage the apparatus if testing is maintained at or near resonant speeds. Use of the previously described flywheels can lower the natural frequency (particularly if more mass is added), but this further limits the transient response capability of the dynamometer. Similarly, vibration can be reduced by adding damping to the driveline by using flexible couplings, but this generally does not eliminate vibration problems at low speed.

Since researchers generally want the 1CTE's operation to replicate what would be expected in the MCE, these drawbacks limit the utility of the information provided by the 1CTE. This is particularly true since the study of engine characteristics at low (idling) speeds, and during transient operation, is of significant interest in the study of fuel economy and emissions reduction, and the limitations of the 1CTE greatly hinder its usefulness for this purpose.

SUMMARY OF THE INVENTION

The invention involves apparata and methods for engine simulation and testing which are intended to at least partially solve the aforementioned problems. To give the reader a basic understanding of some of the advantageous features of the invention, following is a brief summary of preferred versions of the invention. As this is merely a summary, it should be understood that more details regarding the preferred versions may be found in the Detailed Description set forth elsewhere in this document. The claims set forth at the end of this document then define the various versions of the invention in which exclusive rights are secured.

A preferred version of the invention involves a dynamometer suitable for use with a single-cylinder test engine (1CTE), and which allows the 1CTE to simulate a multi-cylinder engine (MCE) by replicating the instantaneous engine dynamics present in an MCE. This is done by having the dynamometer not simply absorb the torque output of the 1CTE (as in standard dynamometers), but by having the dynamometer also provide a motoring torque input to the 1CTE which corresponds to the dynamic torques that would be delivered to the 1CTE from other cylinders in an MCE if the single cylinder of the 1CTE was actually present in a MCE. This motoring torque input is calculated in real time (or nearly so) by hardware and/or software-based calculation means which determine the motoring torque input from the other cylinders as if they were present alongside the single cylinder of the 1CTE. Thus, the 1CTE will act dynamically as if it were actually in a MCE, with instantaneous crankshaft speed being identical to that of an MCE throughout the engine cycle, providing a much more accurate simulation of an MCE. The dynamometer's motoring torque input allows accurate simulation of MCE conditions at low (idling) speeds as well as at high speeds, thereby vastly enhancing the bandwidth at which a 1CTE may be used for MCE simulation. Additionally, the invention need not add significant inertia to the 1CTE, thereby allowing accurate study of transient engine operation.

The invention is therefore of significant benefit to engine research efforts because it allows the use of a simple and relatively inexpensive 1CTE to simulate MCE performance. Because only the one cylinder of the 1CTE is actually tested and the other cylinders of the "virtual" MCE are simulated by a dynamic model, the configuration of the virtual MCE can be rapidly changed by changing its model—for example, to study individual cylinder effects from various engine configurations, and/or to determine the effects of a different number of cylinders. The 1CTE can also be effectively connected to an entire virtual powertrain and/or other components to study any effects from dynamic coupling of these systems, or from transient operation.

While standard engine dynamometers are electromagnetically driven, the dynamometer used in the invention is preferably hydraulically driven, which enhances the ability to instantaneously (or nearly so) provide the calculated motoring torques to the 1CTE. The rapid response of the hydraulic dynamometer is further enhanced by controlling it with high-speed servo-valves as described later in this document. The beneficial rapid response of the hydraulic dynamometer has two ramifications.

First, the ability to rapidly load the 1CTE with the calculated torques allows the invention to simulate MCE performance across a far greater frequency or bandwidth of operating speeds than a 1CTE could do alone. In particular, simulation of MCE dynamic performance at idling speeds can now be performed with a 1CTE. A hydraulic dynamometer also enhances the dynamic range of a 1CTE since its low inertia provides a resonant frequency for the 1CTE/dynamometer system which is well above the standard operating speed range of the 1CTE.

Second, the rapid response of a hydraulic dynamometer allows use of the invention in transient or rapidly changing speed/load conditions. Since most current 1CTE testing apparata use flywheels and dynamometers having large polar moments of inertia, it is extremely difficult (and often effectively impossible) to use them for simulating transient or rapidly changing speed and load conditions. The low inertia of a hydraulic system allows instantaneous (or nearly so) response, and therefore a hydraulic dynamometer is able to rapidly conform itself to transient conditions.

The invention therefore allows simulation and testing apparata and methods which provide much more representative simulation of MCE performance than is believed possible with state-of-the-art 1CTE testing apparata at the time this document was prepared. Preferred versions of the invention allow the ability to test a 1CTE throughout the complete expected engine speed range of the actual MCE in which the cylinder of the 1CTE will be used, with accurate replication of the instantaneous dynamic operation and speed trajectory that would be expected in the MCE throughout the engine cycle. This aspect of the invention is particularly advantageous with respect to testing at idling speeds, since present 1CTE testing apparata known to the inventors simply do not allow a 1CTE to accurately simulate MCE performance at these speeds.

Further advantages, features, and objects of the invention will be apparent from the following detailed description of the invention in conjunction with the associated drawings.

DETAILED DESCRIPTION OF THE PREFERRED EMBODIMENTS OF THE INVENTION

Figure 1:
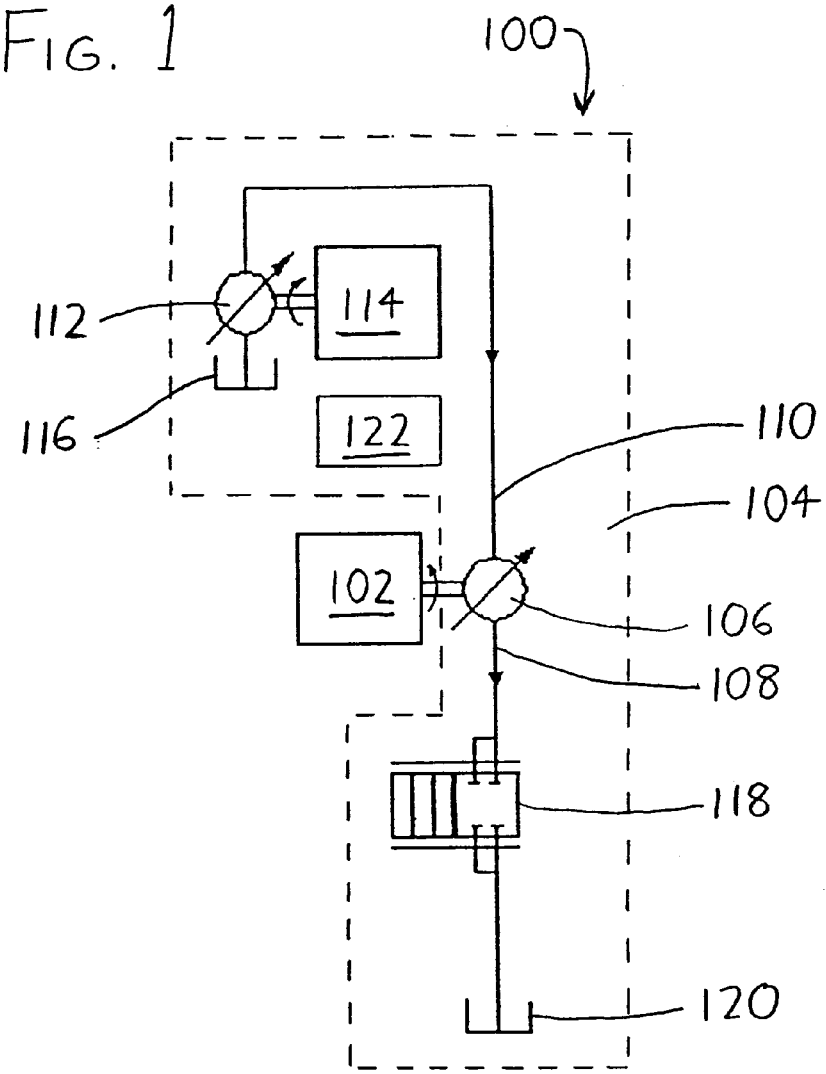
FIG. 1 is a schematic diagram of a first preferred version of the invention, wherein a pump/motor 106 serves as both a loading means for loading the test engine 102, and a torque input means for inputting the torque of additional "virtual" cylinders to the test engine 102.

A first preferred version of the invention developed in the Powertrain Control Research Lab (PCRL) at the University of Wisconsin-Madison will now be described with reference to FIG. 1, wherein an apparatus for simulating internal combustion engine performance is designated generally by the reference numeral 100. A test engine, preferably a single-cylinder test engine (1CTE), is depicted at 102. The remainder of the apparatus 100 is a dynamometer 104 which provides a means for simulating multi-cylinder engine performance when used in combination with the test engine 102. The dynamometer 104 was designed for use with 1CTEs using a Ricardo Hydra test base (Ricardo plc, Shoreham-by-Sea, West Sussex, UK), which is the most commonly used 1CTE test base. The Hydra test base is specially adapted to accommodate 1CTEs for engine research, and it contains the housing and bearings for the 1CTE crankshaft, the lubricating oil sump, as well as various accessories for engine timing, cylinder valve actuation, and other necessities for 1CTE operation. The use of the Hydra test base allows the dynamometer 104 greater versatility in that various 1CTEs of different design are rapidly accommodated in the apparatus 100, and other researchers using the Hydra base for 1CTE testing are able to utilize the dynamometer 104. However, it is emphasized that test bases other than the Hydra may be used instead.

Within the dynamometer 104, a hydraulic pump/motor 106 is attached to the test engine 102, and it applies an absorbing torque when the pressure at the pump/motor outlet 108 is greater than the pressure at the pump/motor inlet 110. In contrast, the pump/motor 106 generates a motoring torque input when the pressure at the pump/motor inlet 110 is greater than the pressure at the pump/motor outlet 108. The pump/motor 106 may thus serve as both a loading means for loading the test engine, and a torque input means for inputting the calculated torque to the test engine. Upstream from the pump/motor 106, the pressure at the pump/motor inlet 110 is maintained at a nearly constant level of 2–20 MPa by a variable displacement supply pump 112, which is driven by electric motor 114 to supply fluid from a reservoir 116 wherein the fluid is cooled and filtered. Motoring torque (i.e., torque input to pump/motor 106) or absorbing torque (i.e., torque output from pump/motor 106) is created by using a servovalve 118 to control the outflow from the pump/motor outlet 108 to a reservoir 120 (which is connected to reservoir 116). Varying the pressure at the pump/motor outlet 108 while the pressure at the pump/motor inlet 110 is held constant controls the amount of torque applied to the test engine 102.

Although servovalves are usually used to change flow direction, the servovalve 118 was chosen for use in the invention to restrict flow because it provides very fast response while allowing proportional control of the valve spool position, thereby allowing variable flow restriction ranging from fully open to fully closed. In FIG. 1, the servovalve 118 is shown attached to the dynamometer 104 in a branched/dual flow configuration that minimizes pressure drop when the servovalve 118 is open.

During operation of the test engine 102, a calculation means (shown at 122) calculates the torque that would be provided to the cylinder(s) of the test engine 102 by one or more additional cylinders if such additional cylinders were present in the test engine 102. The calculation means then adapts the pump/motor 106 performance so that the calculated motoring torque input (if any) is supplied to the test engine 102, thereby causing the test engine 102 to experience the dynamic conditions it would experience if the additional cylinders were present. In effect, part of the simulated MCE is in the hardware of the apparatus 100 (in the test engine 102 and part of its crankshaft and connecting rod), and part is provided "virtually" by the dynamometer 104 (this part corresponding to the remaining cylinders of the MCE which are not present in the test engine 102, as well as their crankshaft and other ancillary hardware that would normally effect multi-cylinder dynamics). The calculation means 122 is preferably provided in the form of one or more of a personal computer, programmable controller, or other processor running suitable software. In the embodiment of the invention 100 developed at the University of Wisconsin, the calculation means was developed using a rapid-prototyping controller from dSPACE (dSPACE Inc., Novi, Mich. USA). Block diagram control models of the various foregoing components of the dynamic model were developed using MATLAB/Simulink software (The MathWorks, Inc., Natick, Mass. USA), and software from dSPACE generated code from the block diagrams allowing their use with the dSPACE controller. Measurement and data acquisition components (not shown) were then provided to monitor conditions within the test engine 102 and elsewhere about the overall apparatus 100, with data being collected by a personal computer running dSPACE Control Desk software. The personal computer communicated the data to the dSPACE controller via an Ethernet connection. Since the single dSPACE controller was used to manage all engine 102 and pump/motor 106 functions, the integration of the engine torque dynamic model into the controls for the torque output of the dynamometer 104 is greatly simplified, and the necessary calculations and data communications functions are greatly speeded up, since each modeled component has complete access to the variables used by the other components. Thus, real-time (or nearly so) calculation of the torque inputs from the "virtual cylinders" is readily achievable. For added safety, a GE Fanuc programmable logic controller (GE Fanuc, Charlottesville, Va. USA) was utilized to independently monitor and shut down the apparatus if any of the measurement/data acquisition components detected operation outside the normal range.

The inventors originally intended to use the overall apparatus 100 as depicted, and simply raise the pressure at the pump/motor inlet 110 to allow the desired motoring torque to be generated. High pressure at the pump/motor inlet 110 would enable both motoring and absorbing capability with a constant supply pressure, with torque being adjusted by varying the pressure at the pump/motor outlet 108 via servovalve 118. However, while the overall apparatus 100 had good dynamic response and was suitable for 1CTE testing and MCE simulation, it was found that the need for high pressure at the pump/motor inlet 110 required approximately 100 kW of power at motor 114 to supply the desired pressure, making the dynamometer 104 costly to operate. Thus, a modified version of the overall apparatus 100 was developed to improve efficiency and decrease cost, and is depicted in FIG. 2 by the reference numeral 200.

Figure 3:
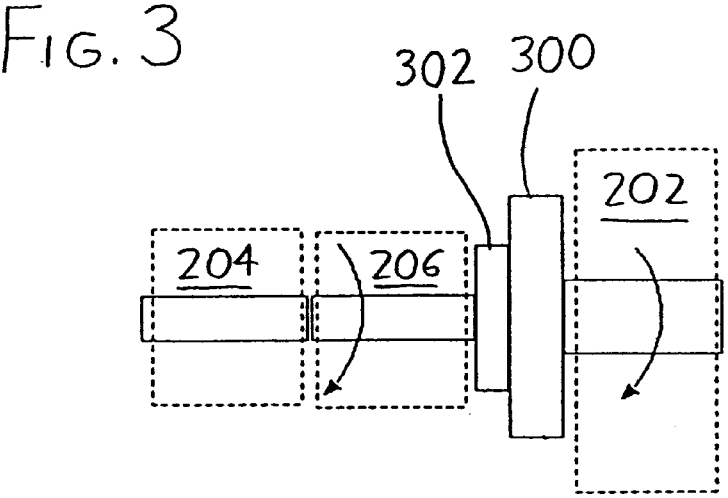
FIG. 3 is a schematic diagram of a preferred coupling arrangement between the test engine 202, pump 204, and motor 206 of FIG. 2.
Figure 2:
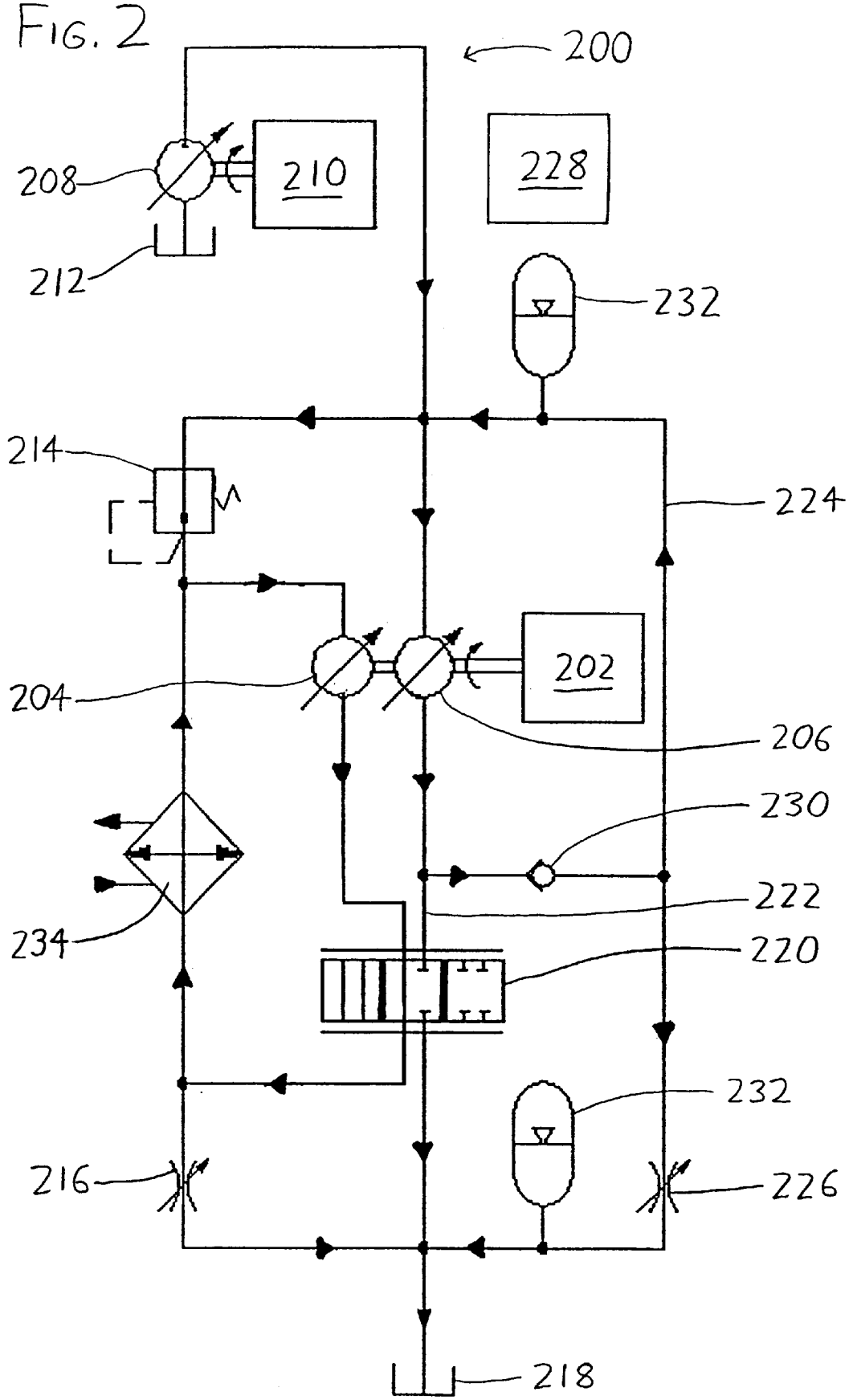
FIG. 2 is a schematic diagram of a second preferred version of the invention, wherein a hydraulic pump 204 serves as a loading means for loading the test engine 202, and a hydraulic motor 206 serves as a torque input means for inputting the torque of additional "virtual" cylinders to the test engine 202.

In FIG. 2, the overall apparatus 200 uses generally the same components as the apparatus 100, with a test engine (preferably a 1CTE) depicted at 202 and the remainder of the overall apparatus 200 hereinafter being referred to as the dynamometer (as it is these remaining components that allow testing of the test engine 202, and which allow it to simulate an MCE having additional cylinders). Rather than using a single component to provide the loading means for loading the test engine and the torque input means for inputting the calculated torque to the test engine (as with pump/motor 106 in the apparatus 100), a separate hydraulic pump 204 and hydraulic motor 206 are respectively connected to the test engine 202 via a torque tube to apply absorbing and motoring torque. This driveline arrangement is illustrated in more detail in FIG. 3, wherein an adjustable flywheel 300 is also shown. The adjustable flywheel 300 has insertable and removable flywheel weights (not shown) to allow the inertia of the apparatus 200 to be sized to match that of the MCE being simulated. A torsionally rigid (but flexible) coupling (not shown) is also provided to allow for slight misalignment in the driveline, and an in-line short flange torque transducer 302 from Lebow Products (Troy, Mich., USA) is provided for torque monitoring. The distance from the crankshaft of the test engine 202 to the motor 206 is less than ten centimeters, providing high stiffness for the system. Apart from assisting in avoidance of driveline vibration, the high stiffness enables the engine crankshaft, flywheel, flex plate, torque transducer, motor shaft, and pump shaft to be modeled (if desired) as one rigid component with constant inertia, which simplifies the dynamic model and speeds calculations. Variable displacement pumps and motors were selected for the pump 204 and hydraulic motor 206 to allow the motor/pump displacement to be reduced at high engine speeds, thereby keeping fluid flow within a smaller range during low and high speed operation and making it possible to optimize the efficiency of the system under all conditions.

A supply pump 208 driven by a motor 210 is used to supply fluid to the apparatus 200 from a reservoir 212. To decrease the flow demand from supply pump 208, the loading means for loading the test engine 202 (i.e., the pump 204) circulates fluid in a loop including a heat exchanger 234. When necessary, the pump 204/heat exchanger 234 loop can receive fluid from the supply pump 208 via pressure reducing valve 214, and can additionally bleed excess fluid from restrictor valve 216 to the receiving reservoir 218 (which is connected to reservoir 212) for filtering. Similarly, the torque input means for inputting torque to the test engine 202 (i.e., the motor 206) may circulate fluid in bypass circuit 224, and it receives fluid from the supply pump 208 and can bleed excess fluid from the bypass circuit 224 through restrictor valve 226 to the receiving reservoir 218.

The motor 206 used to supply motoring torque is situated between the supply pump 208 and the receiving reservoir 218, with a servovalve 220 situated at the motor outlet 222 (this servovalve 220 also being provided in the loop/circuit for the pump 204). The servovalve 220 provides variable restriction among the three illustrated valve positions, which are (1) pump loop and motor outlet both fully open, (2) pump loop fully open and motor outlet fully closed, and (3) pump loop and motor outlet both fully closed. Accumulators 232 are provided about the circuit to maintain more uniform supply and return pressures in the motor circuit from cycle to cycle. During the intermittent times when servovalve 220 is in the position illustrated in FIG. 2 (pump loop fully open and motor outlet fully closed), fluid is generally prevented from flowing directly from the supply pump 208 to the receiving reservoir 218, and the accumulators 232 either fill (if receiving fluid from supply pump 208) or drain (if supplying fluid to receiving reservoir 218) due to the nearly constant flow between the receiving reservoir 218 and supply pump 208. In this valve position the net torque produced by the dynamometer is nearly zero. Fluid from the pump 204 flows unrestricted through the servovalve 220, through a heat exchanger 234, and back to the inlet of pump 204. The inlet and outlet pressures of pump 204 are approximately the same, resulting in no absorbing torque by the pump 204. At the same time, fluid from the motor 206 is prevented from flowing through the servovalve 220. Instead, it is diverted through a check valve 230 into a bypass loop 224 where it flows back to the inlet of motor 206. Since the check valve 230 is open, the pressure at the inlet and outlet of motor 206 is nearly the same, resulting in no motoring torque by the motor 206. The recirculation of high pressure fluid through the check valve 230 to the bypass circuit 224 and accumulator 232 significantly reduces power consumption in comparison to apparatus 100, where the supply pump 112 constantly delivers fluid at sufficient pressure and flow to generate the maximum motoring torque. Since the motoring torque is only required during a portion of each cycle of the engine 202, the power required to operate apparatus 200 is much less than apparatus 100.

As in the dynamometer 104, the dynamometer of the apparatus 200 also includes a calculation means 228 which calculates the torque that would be provided to the cylinders of the test engine 202 by one or more additional cylinders if such additional cylinders were present in the test engine. After the additional torque from the "virtual cylinders" is calculated, the calculation means 228 communicates with the servovalve 220 to open the motor outlet 222, thereby allowing fluid to flow from the supply pump 208 to the receiving reservoir 218 to have the motor 206 provide motoring torque input to the test engine 202. When the servovalve 220 switches to this motoring mode, its port situated in the loop/circuit for the pump 204 is preferably fully open to minimize the absorbing torque produced by the pump 204.

It is understood that the preferred versions of the invention are shown and described above to illustrate different possible features of the invention and the varying ways in which these features may be combined. Apart from combining the different features of the above embodiments in varying ways, other modifications are also considered to be within the scope of the invention. Following is an exemplary list of such modifications.

First, the invention is usable with test engines having more than one cylinder—for example, it could be used on a two- to five-cylinder test engine to simulate the performance of a six-cylinder engine. In general, it is expected that the invention will find its greatest value in use with a 1CTE owing to the previously noted advantages of 1CTEs (e.g., ease and lesser expense of installing measuring devices and making modifications to the single cylinder). However, it is known that 1CTEs are in some cases difficult to use because of problems dynamically balancing the single cylinder's crankshaft; in effect, the crank functions as a large rotating unbalanced mass, causing vibration problems. In MCEs, such balancing problems can often be reduced because the unbalanced forces and torques of each cylinder can be phased to cancel each other out. Thus, depending on the proposed engine design in question, it may in some cases be useful to use a test engine having two or more cylinders, and the torque inputs from the absent cylinders may be calculated and provided to the two or more cylinders present.

Second, the loading means for loading the test engine need not be limited to a hydraulic pump. Other devices for absorbing energy, such as pneumatic pumps (i.e., compressors) and electromagnetic pumps (i.e., generators) might be used instead. A hydraulic pump is nonetheless the most preferred loading means for the previously discussed versions of the invention owing to the aforementioned advantages. In similar fashion, the input means for inputting torque to the test engine may take other forms than the hydraulic motor previously discussed, and pneumatic or electromagnetic motors may be used instead. Again, a hydraulic motor is more preferred for the described versions of the invention, particularly owing to the rapid response and high stiffness a hydraulic system provides. Electric pumps and/or motors could be used to provide faster torque response, but their generally higher inertia prevents them from changing speed quickly and they may not be able to simulate the speed fluctuations of a MCE along the same range of speeds accommodated by the hydraulic systems described previously.

Third, while the preferred form of calculation means for calculating the torque to be supplied to the test engine from the absent "virtual" cylinders was previously described as a personal computer running suitable software, one of ordinary skill will understand that a wide variety of equivalent processing devices may be used instead, such as programmable electronic control modules and other programmable devices which allow rapid calculations. While such reprogrammable processors are preferred owing to their versatility, preprogrammed processors such as suitably configured digital or analog circuits (e.g., Application Specific Integrated Circuits) might also be used.

Fourth, it should be understood that the calculation means is useful for adding in a wide variety of torque inputs and/or loads apart from those imposed by other cylinders. The calculation means may allow calculation (and subsequent input) of any combination of combustion torques, motoring torques, friction or pumping torques, inertia torques, ancillary torques, steady-state or transient driveline torques, or any other torques that would be present in the MCE or in the virtual powertrain system. In essence, the calculation means need not merely calculate the effect of other absent or "virtual" cylinders on the test engine, and may extend its calculations to account for other components present in the "virtual vehicle" wherein the test engine is located.

Fifth, while the apparatus 200 was illustrated and described as using a single servovalve 220 to control torque absorption and motoring torque input in two commonly-supplied circuits, it should be understood that it is also possible to have independent motoring and absorption circuits (i.e., unconnected and independently-supplied circuits), and/or independently controlled circuits. Use of a common fluid supply is preferred for the described apparatus 200 because it is more economical, but in some cases independent circuits/supplies may be desirable, e.g., where different fluids are used in the motoring and absorbing circuits. Similarly, use of a single servovalve is preferred because a single servovalve serving both the motoring and absorbing circuits is less expensive to provide and control than dual servovalves working independently in each circuit. However, whether use of a single or multiple valves is desirable will also be driven by the forms of valves used and the manner in which they are controlled, since valves other than servovalves may also be used in the invention.

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. A method of simulating internal combustion engine performance comprising:
   a. loading a test engine having one or more test engine cylinders;
   b. calculating the torque that would be provided to the test engine cylinders by one or more additional simulated cylinders; and
   c. inputting the calculated torque to the test engine.

2. The method of claim 1 further comprising the step of measuring one or more performance output characteristics of the test engine, and wherein the performance output characteristics include test engine speed and test engine torque.

3. The method of claim 1 wherein the steps of loading the test engine and inputting the calculated torque to the test engine are both performed by a pump.

4. The method of claim 3 wherein the step of inputting the calculated torque to the test engine is performed by adjusting at least one of the pump inlet pressure and the pump outlet pressure.

5. An apparatus for simulating internal combustion engine performance comprising:
   a. a test engine baying one or more test engine cylinders;
   b. loading means for loading the test engine;
   c. calculation means for calculating the torque that would be provided to the test engine cylinders by one or more additional simulated cylinders;
   d. torque input means for inputting the calculated torque to the test engine.

6. The apparatus of claim 5 wherein the loading means comprises a hydraulic pump.

7. The apparatus of claim 5 wherein the loading means comprises at least one of:
   a. a hydraulic pump;
   b. a compressor; and
   c. a generator.

8. The apparatus of claim 5 wherein the loading means and the torque input means are the same component.

9. The apparatus of claim 5 wherein the input means comprises a hydraulic motor.

10. The apparatus of claim 5 wherein the loading means comprises at least one of:
    a. a hydraulic motor;
    b. a pneumatic motor; and
    c. an electric motor.

11. An apparatus for simulating internal combustion engine performance comprising:
    a. a test engine having one or more test engine cylinders;
    b. a pump connected to the test engine and receiving energy output therefrom;
    c. a processor wherein input energy to the test engine is calculated, the input energy corresponding at least in part to the energy that would be provided to the test engine by one or more additional simulated engine cylinders;
    d. a motor connected to the test engine and providing the calculated input energy thereto.

12. The apparatus of claim 11 wherein the pump and motor are the same component.

13. The apparatus of claim 12 further comprising a valve situated in line with the pump and motor.

14. The apparatus of claim 11 wherein the pump is in line with a heat exchanger.

15. The apparatus of claim 11 further comprising:
    a. a pressurized fluid supply in line with the motor, whereby fluid output from the fluid supply may drive the motor;
    b. a valve in line with the motor and fluid supply, wherein the valve regulates fluid output of the fluid supply to the motor.

16. The apparatus of claim 15 further comprising a heat exchanger in line with the pump.

17. The apparatus of claim 16 wherein the heat exchanger and pump are provided in a pump circuit whereby fluid passing through the heat exchanger and pump is recirculated.

18. The apparatus of claim 17 wherein the fluid supply, motor, and valve are provided in a motor circuit whereby fluid passing through the fluid supply, motor, and valve is recirculated.

19. The apparatus of claim 18 wherein the valve is also situated in the pump circuit.

20. The apparatus of claim 16 wherein the valve is also in line with the heat exchanger and pump.

* * * * *